United States Patent
Lee et al.

(10) Patent No.: US 11,029,554 B2
(45) Date of Patent: Jun. 8, 2021

(54) DISPLAY DEVICE

(71) Applicant: Samsung Display Co., Ltd., Yongin-Si (KR)

(72) Inventors: Jin Su Lee, Suwon-si (KR); Kook Hyun Choi, Asan-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/904,862

(22) Filed: Jun. 18, 2020

(65) Prior Publication Data

US 2021/0109399 A1  Apr. 15, 2021

(30) Foreign Application Priority Data

Oct. 15, 2019 (KR) .................. 10-2019-0127891

(51) Int. Cl.
*G02F 1/1335* (2006.01)
*G02F 1/1362* (2006.01)

(52) U.S. Cl.
CPC .. *G02F 1/133514* (2013.01); *G02F 1/136286* (2013.01)

(58) Field of Classification Search
CPC ......... G02F 1/133514; G02F 1/133512; G02F 1/134309; G02F 1/136286
USPC ................................. 349/106–109
See application file for complete search history.

(56) References Cited

U.S. PATENT DOCUMENTS 6,128,057 A    10/2000 Suzuki et al.
2016/0178961 A1*  6/2016 No .................. G02F 1/133514
                                                            349/106

FOREIGN PATENT DOCUMENTS

| JP | 4409589 B2 | 2/2010 |
|----|------------|--------|
| KR | 10-0614332 B1 | 8/2006 |
| KR | 10-2013-0034168 A | 4/2013 |
| KR | 10-2017-0078052 A | 7/2017 |
| WO | 2010-134620 A1 | 11/2010 |

* cited by examiner

*Primary Examiner* — Charles S Chang
(74) *Attorney, Agent, or Firm* — Innovation Counsel LLP

(57) ABSTRACT

A display device comprises a plurality of pixels including a first pixel having a first color filter, a second pixel having a second color filter, and a third pixel having a third color filter, a plurality of first signal lines and a plurality of second signal lines, a first overlapping portion in which the first and the second color filters overlap each other in an adjacent portion of the first and the second pixels, a second overlapping portion in which the second and the third color filters overlap each other that overlap one of the second signal lines in an adjacent portion of the second and the third pixels, and a third overlapping portion in which the third and the first color filters overlap each other that overlap two of the second signal lines in an adjacent portion of the third and the first pixels.

20 Claims, 15 Drawing Sheets

DISPLAY DEVICE

CROSS-REFERENCE TO RELATED APPLICATION

This application claims priority to and the benefit of Korean Patent Application No. 10-2019-0127891 filed in the Korean Intellectual Property Office on Oct. 15, 2019, the entire contents of which are incorporated herein by reference.

BACKGROUND

(a) Field

The present disclosure relates to a display device, and more particularly, to a display device that may have improved display quality.

(b) Description of the Related Art

A liquid crystal display is one of flat panel displays which are most widely used, and includes two sheets of display panels in which field generating electrodes such as a pixel electrode and a common electrode are formed, and a liquid crystal layer interposed between the pixel electrode and the common electrode, and displays an image by applying a voltage to the field generating electrodes to generate an electric field in the liquid crystal layer, thereby determining an orientation of liquid crystal molecules of the liquid crystal layer based on the generated electric field and controlling polarization of incident light.

As a resolution of the liquid crystal display increases and a demand for high display quality increases, there is need to develop a novel way to prevent a contrast ratio from being reduced by light reflected from a surface of a signal line without reducing an aperture ratio of the liquid crystal display.

The above information disclosed in this Background section is only for enhancement of understanding of the background of the current disclosure, and therefore it may contain information that does not form the prior art that is already known in this country to a person of ordinary skill in the art.

SUMMARY

Embodiments have been made in an effort to provide a liquid crystal display that may reduce influence of light reflected from a surface of a signal line without reducing an aperture ratio of the liquid crystal display.

A display device according to an embodiment comprises: a plurality of pixels disposed along a first direction and comprising a first pixel including a first color filter, a second pixel including a second color filter, and a third pixel including a third color filter; a plurality of first signal lines and a plurality of second signal lines extending in a second direction substantially perpendicular to the first direction and insulated from each other; a first overlapping portion in which the first color filter and the second color filter overlap each other in an adjacent portion of the first pixel and the second pixel; a second overlapping portion in which the second color filter and the third color filter overlap each other that overlap one of the second signal lines in an adjacent portion of the second pixel and the third pixel; and a third overlapping portion in which the third color filter and the first color filter overlap each other that overlap two of the second signal lines in an adjacent portion of the third pixel and the first pixel.

The first overlapping portion, the second overlapping portion, and the third overlapping portion may extend in the second direction.

A width of the third overlapping portion may be wider a width that of the second overlapping portion, and the width of the second overlapping portion may be wider than a width of the first overlapping portion.

Light transmittance of the first overlapping portion may be greater than light transmittance of the second overlapping portion, and the light transmittance of the second overlapping portion may be greater than light transmittance of the third overlapping portion.

Light transmittance of the first color filter may be smaller than light transmittance of the second color filter, and light transmittance of the third color filter may be smaller than light transmittance of the first color filter.

One of the plurality of first signal lines may overlap the first overlapping portion, and the first overlapping portion may not overlap the plurality of second signal lines.

Two of the plurality of first signal lines may be disposed at each side of the one second signal line overlapping the second overlapping portion respectively.

Two of the plurality of first signal lines may be disposed at each side of two second signal lines overlapping the third overlapping portion respectively.

A display device according to an another embodiment comprises: a plurality of pixels disposed along a first direction and including a first pixel, a second pixel, and a third pixel; a first voltage line, a second voltage line, a third voltage line, a fourth voltage line, and a fifth voltage line disposed in order along the first direction and extending along a second direction substantially perpendicular to the first direction; and a first data line, a second data line, and a third data line insulated from the first voltage line, the second voltage line, the third voltage line, the fourth voltage line, and the fifth voltage line, disposed in order along the first direction, and extending along the second direction. The first data line and the second data line may be disposed between the first voltage line and the second voltage line adjacent to each other, and the third data line may be disposed between the fourth voltage line and the fifth voltage line adjacent to each other.

A display device according to an another embodiment comprises: a plurality of pixels disposed along a first direction and including a first pixel, a second pixel, and a third pixel; a first voltage line, a second voltage line, a third voltage line, a fourth voltage line, and a fifth voltage line disposed in order along the first direction and extending along a second direction substantially perpendicular to the first direction; a first data line, a second data line, and a third data line insulated from the first voltage line, the second voltage line, the third voltage line, the fourth voltage line, and the fifth voltage line, disposed in order along the first direction, and extending along the second direction. The first data line and the second data line may be disposed between the first voltage line and the second voltage line adjacent to each other, and the third data line may be disposed between the second voltage line and the third voltage line adjacent to each other.

The fourth voltage line and the fifth voltage line may be disposed between the second pixel and the third pixel, and no data line may be disposed between the fourth voltage line and the fifth voltage line.

A display device according to an another embodiment comprises: a plurality of pixels disposed along a first direction and including a first pixel, a second pixel, and a third pixel; a first voltage line, a second voltage line, a third voltage line, a fourth voltage line, and a fifth voltage line disposed in order along the first direction and extending along a second direction substantially perpendicular to the first direction; a first data line, a second data line, and a third data line insulated from the first voltage line, the second voltage line, the third voltage line, the fourth voltage line, and the fifth voltage line, disposed in order along the first direction, and extending along the second direction. The first data line and the second data line may be disposed between the first voltage line and the second voltage line, and a portion of the third data line may be disposed between the second voltage line and the third voltage line, while another portion of the third data line may be disposed between the fourth voltage line and the fifth voltage line.

The second voltage line, the third voltage line, and the second data line may be connected to the first pixel; the third voltage line, the fourth voltage line, and the third data line may be connected to the second pixel; and the fifth voltage line, the first voltage line, and the first data line may be connected to the third pixel.

The first pixel may include a first color filter, the second pixel may include a second color filter, and the third pixel may include a third color filter; a first insulating film disposed between the first voltage line, the second voltage line, the third voltage line, the fourth voltage line, the fifth voltage line, and the first data line, the second data line, and the third data line and a second insulating film disposed on the first data line, the second data line, and the third data line may be further included; and the first color filter, the second color filter, and the third color filter may be disposed on the second insulating film.

According to embodiments, it is possible to reduce influence of light reflected from a surface of a signal line without reducing an aperture ratio of a display device.

DETAILED DESCRIPTION OF THE EMBODIMENTS

Figure 1:
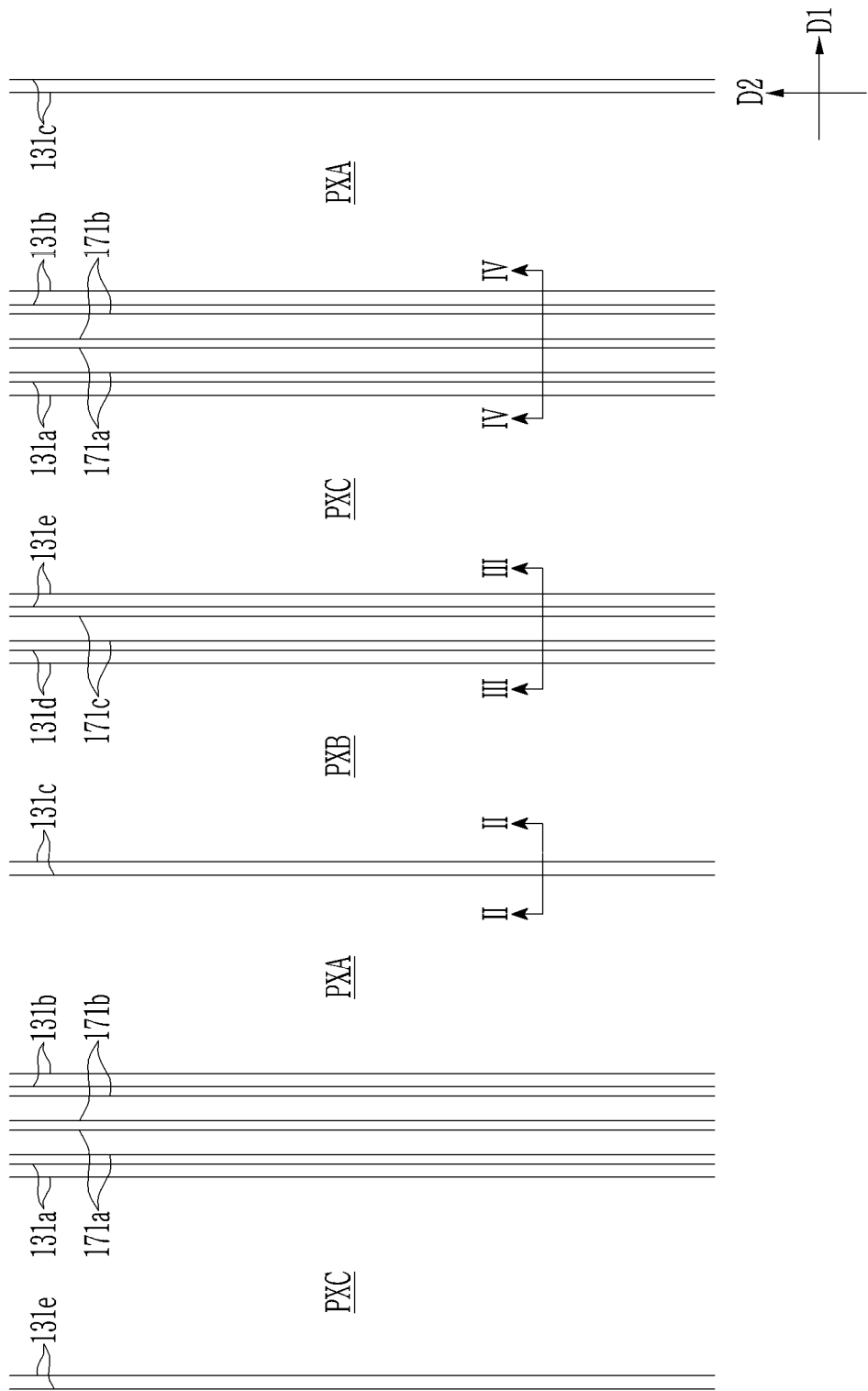
FIG. 1 is a layout view for conceptually illustrating an arrangement of signal lines of a display device according to an embodiment.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Parts that are irrelevant to the description will be omitted to clearly describe the present disclosure, and like reference numerals designate like elements throughout the specification.

Further, in the drawings, the size and thickness of each element are arbitrarily illustrated for ease of description, and the present disclosure is not necessarily limited to those illustrated in the drawings. In the drawings, the thicknesses of layers, films, panels, regions, etc., are exaggerated for clarity. In the drawings, for ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" means viewing a target portion from the top, and the phrase "in a cross-sectional view" means viewing a cross-section formed by vertically cutting a target portion from the side.

Referring to FIG. 1, arrangement of signal lines of a display device according to an embodiment will be described. FIG. 1 is a layout view for conceptually illustrating an arrangement of signal lines of a display device.

Referring to FIG. 1, the display device includes a first pixel PXA, a second pixel PXB, and a third pixel PXC that are disposed along a first direction D1 and display different colors, and a plurality of signal lines 131a, 131b, 131c, 131d, 131e, 171a, 171b, and 171c extending along a second direction D2 substantially perpendicular to the first direction D1.

The first pixel PXA may display a first color R, the second pixel PXB may display a second color G, and the third pixel PXC may display a third color B. For example, the first color R may be red, the second color G may be green, and the third color B may be blue. However, the first color R, the second color G, and the third color B are not limited, and they may respectively display any one of other primary colors. In FIG. 1, the first pixel PXA, the second pixel PXB, and the third pixel PXC are repeatedly arranged along the first direction D1, but, alternatively, the display device may further include an additional pixel displaying a color different from the first color R, the second color G, and the third color B. In addition, the first pixel PXA, the second pixel PXB, the third pixel PX3, and the additional pixel may have a striped arrangement structure, a mosaic arrangement structure, a triangular arrangement structure, and the like. In the case of the striped arrangement, only pixels displaying the same color are arranged in one column, and pixels displaying different colors are alternately arranged in one row. In the case of the mosaic arrangement, pixels that display red and different colors are alternately arranged in column and row directions. In the case of the triangular arrangement, pixels displaying different colors are alternately arranged in a row direction, but are diagonally arranged in a zigzag form in a column direction.

As depicted in FIG. 1, the third pixel PXC is located to a first side of the first pixel PXA along the first direction D1, and the second pixel PXB is located to a second side of the first pixel PXA along the first direction D1. For example, the first side may be a left side and the second side may be a right side.

A first voltage line 131a and a second voltage line 131b are disposed between the first pixel PXA and the third pixel PXC that are adjacent to each other, and a first data line 171a and a second data line 171b are disposed between the first voltage line 131a and the second voltage line 131b that are adjacent to each other.

A third voltage line 131c is disposed between the first pixel PXA and the second pixel PXB that are adjacent to each other.

A fourth voltage line 131d and a fifth voltage line 131e are disposed between the second pixel PXB and the third pixel PXC that are adjacent to each other, and a third data line 171c is disposed between the fourth voltage line 131d and the fifth voltage line 131e that are adjacent to each other.

Although not shown, the second voltage line 131b and the third voltage line 131c disposed at both sides of the first pixel PXA, and the second data line 171b disposed adjacent to the first pixel PXA may be connected to an element such as a transistor and a capacitor included in the first pixel PXA to apply a predetermined voltage and a data voltage to the first pixel PXA.

Similarly, the third voltage line 131c and the fourth voltage line 131d disposed at both sides of the second pixel PXB, and the third data line 171c disposed adjacent to the second pixel PXB, may be connected to an element such as a transistor and a capacitor included in the second pixel PXB to apply a predetermined voltage and a data voltage to the second pixel PXB.

In addition, the fifth voltage line 131e and the first voltage line 131a disposed at both sides of the third pixel PXC, and the first data line 171a disposed adjacent to the third pixel PXC, may be connected to an element such as a transistor and a capacitor included in the third pixel PXC to apply a predetermined voltage and a data voltage to the third pixel PXC.

Although not shown, the first voltage line 131a, the second voltage line 131b, the third voltage line 131c, the fourth voltage line 131d, and the fifth voltage line 131e may further include a horizontal portion extending in the first direction D1, and they may be connected to each other by the horizontal portion to receive the same voltage. Although not shown, a gate line extending along the first direction D1 may be further included, and the horizontal portion of the first voltage line 131a, the second voltage line 131b, the third voltage line 131c, the fourth voltage line 131d, and the fifth voltage line 131e, and the gate line, may be disposed adjacent to an element such as transistors and a capacitor included in each of the pixels PXA, PXB, and PXC to be covered by a light blocking member.

Figure 2:
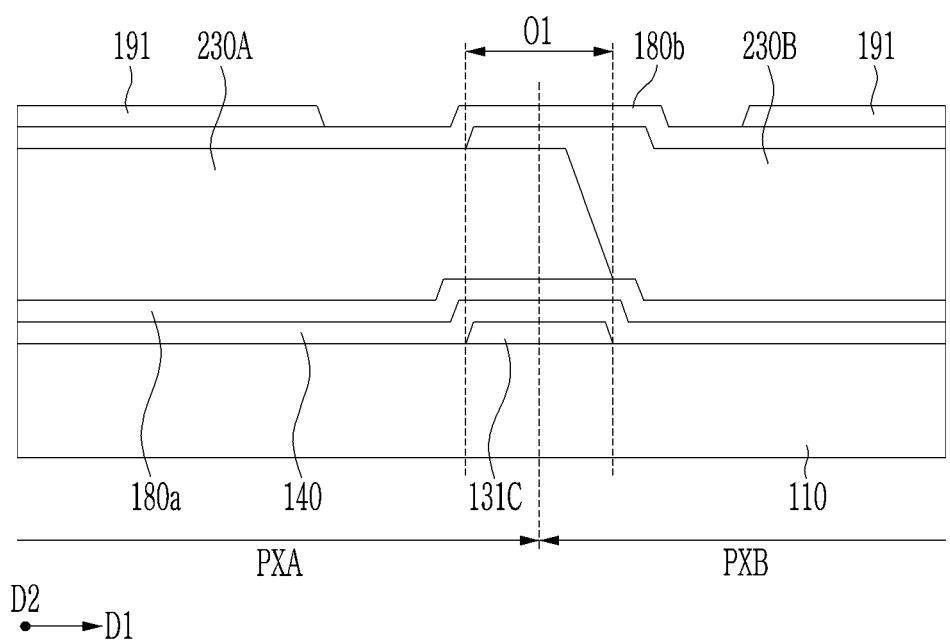
FIG. 2 is a cross-sectional view taken along line II-II of a portion between a first pixel and a second pixel of FIG. 1.

An interlayer structure such as a signal line and an insulating film between two adjacent pixels will be described with reference to FIG. 2 to FIG. 4 along with FIG. 1. FIG. 2 is a cross-sectional view taken along line II-II of FIG. 1, FIG. 3 is a cross-sectional view taken along line III-III of FIG. 1, and FIG. 4 is a cross-sectional view taken along line IV-IV of FIG. 1.

Referring to FIG. 2 with FIG. 1, the third voltage line 131c is disposed on a first substrate 110, and a gate insulating film 140 is disposed on the third voltage line 131c. A first passivation film 180p is disposed on the gate insulating film 140, and a first color filter 230A and a second color filter 230B are disposed on the first passivation film 180p. The first color filter 230A is disposed in the first pixel PXA, the second color filter 230B is disposed in the second pixel PXB, and a first overlapping portion O1 in which the first color filter 230A and the second color filter 230B partially overlap is disposed in an adjacent portion of the first pixel PXA and the second pixel PXB. The first overlapping portion O1 may be disposed along the second direction D2. The third voltage line 131c disposed between the first pixel PXA and the second pixel PXB overlaps the first overlapping portion O1 of the first color filter 230A and the second color filter 230B. The first overlapping portion O1 may only overlap the third voltage line 131c and may not overlap the data line. A second passivation film 180q is disposed on the first color filter 230A and the second color filter 230B, and a pixel electrode 191 is disposed on the second passivation film 180q. Although not shown, the display device may further include a second substrate facing the first substrate 110, a common electrode disposed on the second substrate, and a liquid crystal layer disposed between the first substrate and the second substrate.

Figure 3:
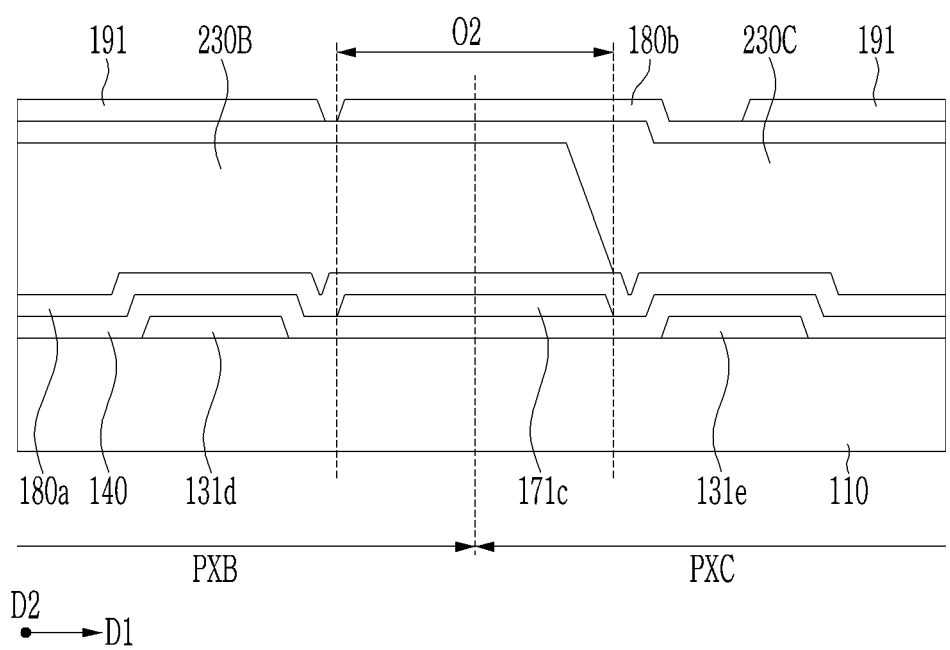
FIG. 3 is a cross-sectional view taken along line III-III of a portion between a second pixel and a third pixel of FIG. 1.

Referring to FIG. 3, the fourth voltage line 131d and the fifth voltage line 131e are disposed on the first substrate 110, the gate insulating film 140 is disposed on the fourth voltage line 131d and the fifth voltage line 131e, the third data line 171c is disposed on the gate insulating film 140, the first passivation film 180p is disposed on the third data line 171c, and the second color filter 230B and the third color filter 230C are disposed on the first passivation film 180p. The second color filter 230B is disposed in the second pixel PXB, the third color filter 230C is disposed in the third pixel PXC, and a second overlapping portion O2 in which the second color filter 230B and the third color filter 230C partially overlap is disposed in an adjacent portion of the second pixel PXB and the third pixel PXC. The second overlapping portion O2 may be disposed along the second direction D2. The second overlapping portion O2 overlaps the third data line 171c, the fourth voltage line 131d overlaps the second color filter 230B, and the fifth voltage line 131e overlaps the third color filter 230C. The second passivation film 180q is disposed on the second color filter 230B and the third color filter 230C, and the pixel electrode 191 is disposed on the second passivation film 180q. Although not shown, the display device may further include a second substrate facing the first substrate 110, a common electrode disposed on the second substrate, and a liquid crystal layer disposed between the first substrate and the second substrate.

Figure 4:
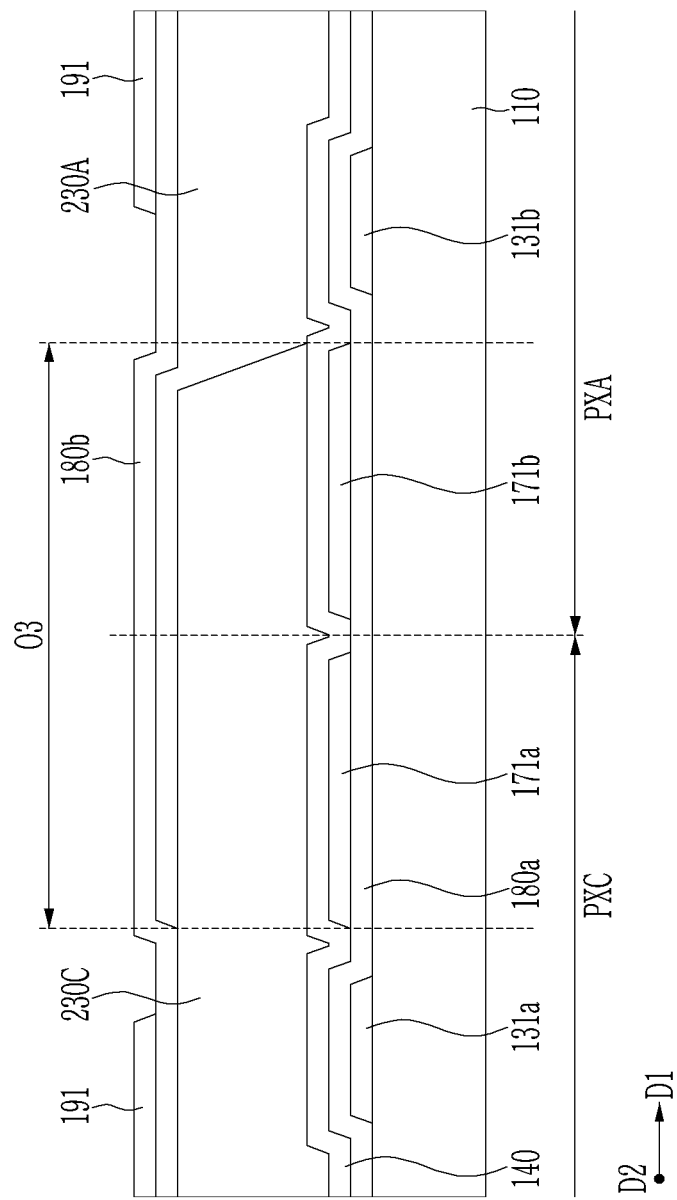
FIG. 4 is a cross-sectional view taken along line IV-IV of a portion between a third pixel and a first pixel of FIG. 1.

Referring to FIG. 4, the first voltage line 131a and the second voltage line 131b are disposed on the first substrate 110, the gate insulating film 140 is disposed on the first voltage line 131a and the second voltage line 131b, the first data line 171a and the second data line 171b are disposed on the gate insulating film 140, the first passivation film 180p is disposed on the first data line 171a and the second data line 171b, and the third color filter 230C and the first color filter 230A are disposed on the first passivation film 180p. The third color filter 230C is disposed in the third pixel PXC, the first color filter 230A is disposed in the first pixel PXA, and a third overlapping portion O3 in which the third color filter 230C and the first color filter 230A partially overlap is disposed in an adjacent portion of the third pixel PXC and the first pixel PXA. The third overlapping portion O3 may be disposed along the second direction D2. The third overlapping portion O3 overlaps the first data line 171a and the second data line 171b, the first voltage line 131a overlaps the third color filter 230C, and the second voltage line 131b overlaps the first color filter 230A. The second passivation film 180q is disposed on the third color filter 230C and the first color filter 230A, and the pixel electrode 191 is disposed on the second passivation film 180q. Although not shown, the display device may further include a second substrate facing the first substrate 110, a common electrode disposed on the second substrate, and a liquid crystal layer disposed between the first substrate and the second substrate.

Referring to FIG. 2 to FIG. 4, a width of the second overlapping portion O2 of the second color filter 230B and the third color filter 230C may be wider than that of the first overlapping portion O1 of the first color filter 230A and the second color filter 230B, and a width of the third overlapping portion O3 of the third color filter 230C and the first color filter 230A may be wider than that of the second overlapping portion O2 of the second color filter 230B and the third color filter 230C. Accordingly, the third overlapping portion O3 is wider than the first overlapping portion O1.

Figure 5:
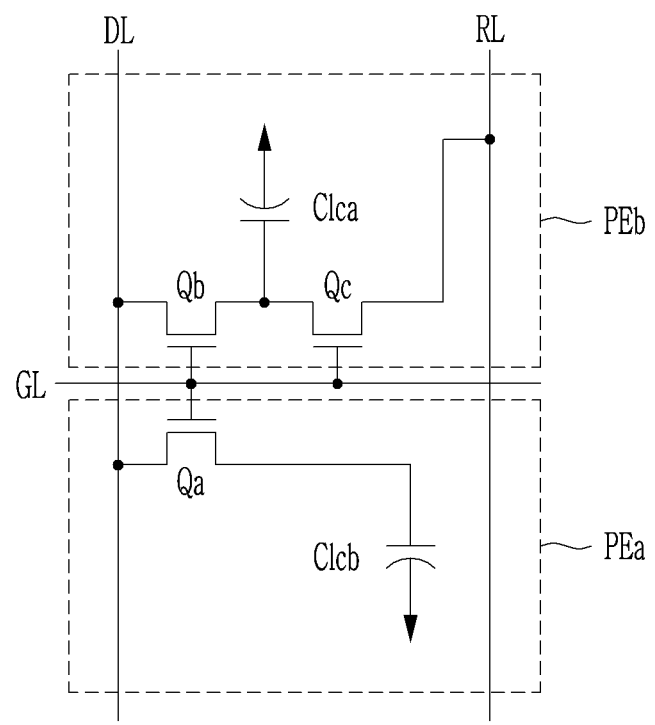
FIG. 5 is an equivalent circuit diagram of one pixel of a display device according to an embodiment.
Figure 6:
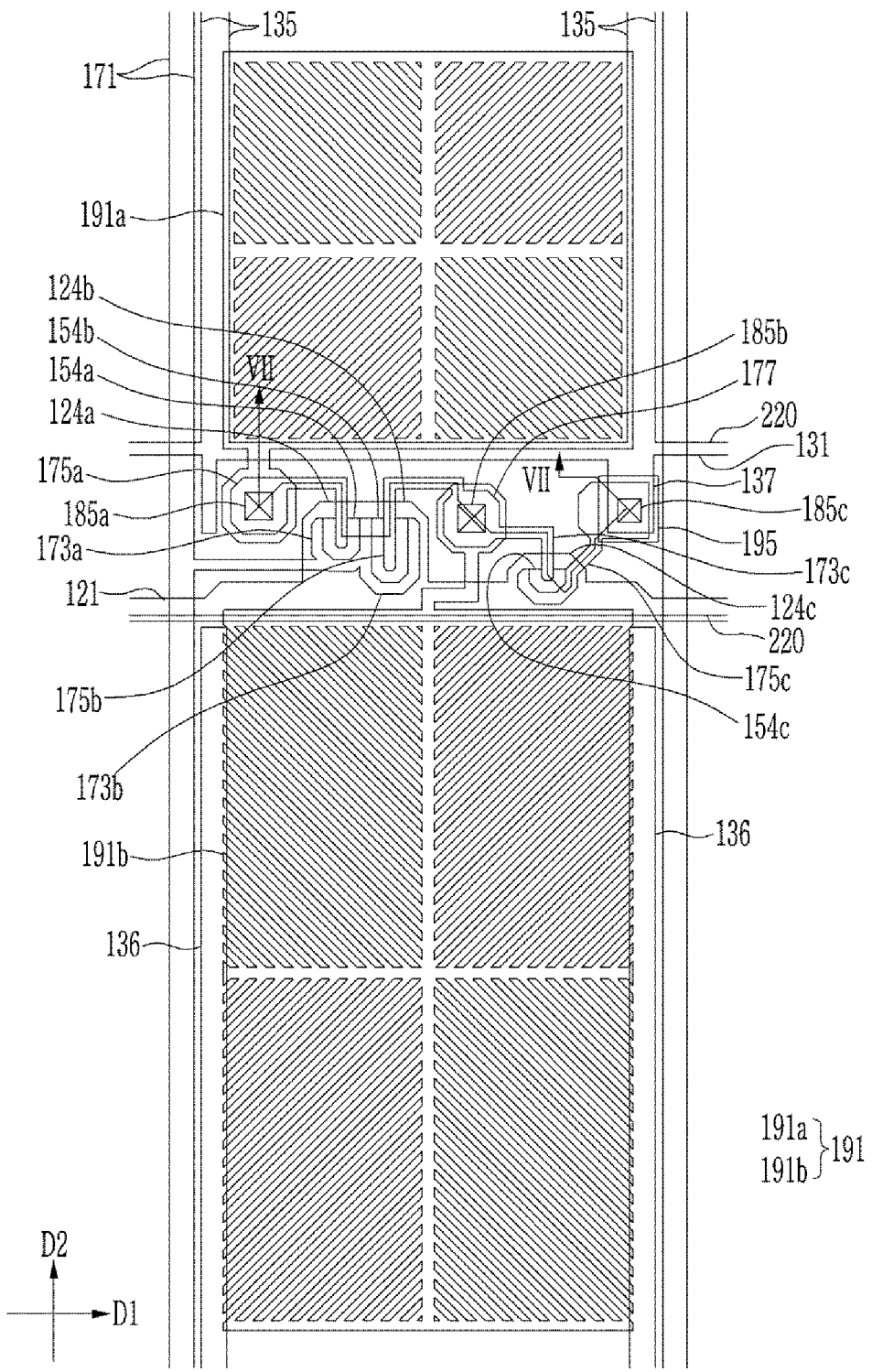
FIG. 6 is a layout diagram of one pixel of a display device according to an embodiment.
Figure 7:
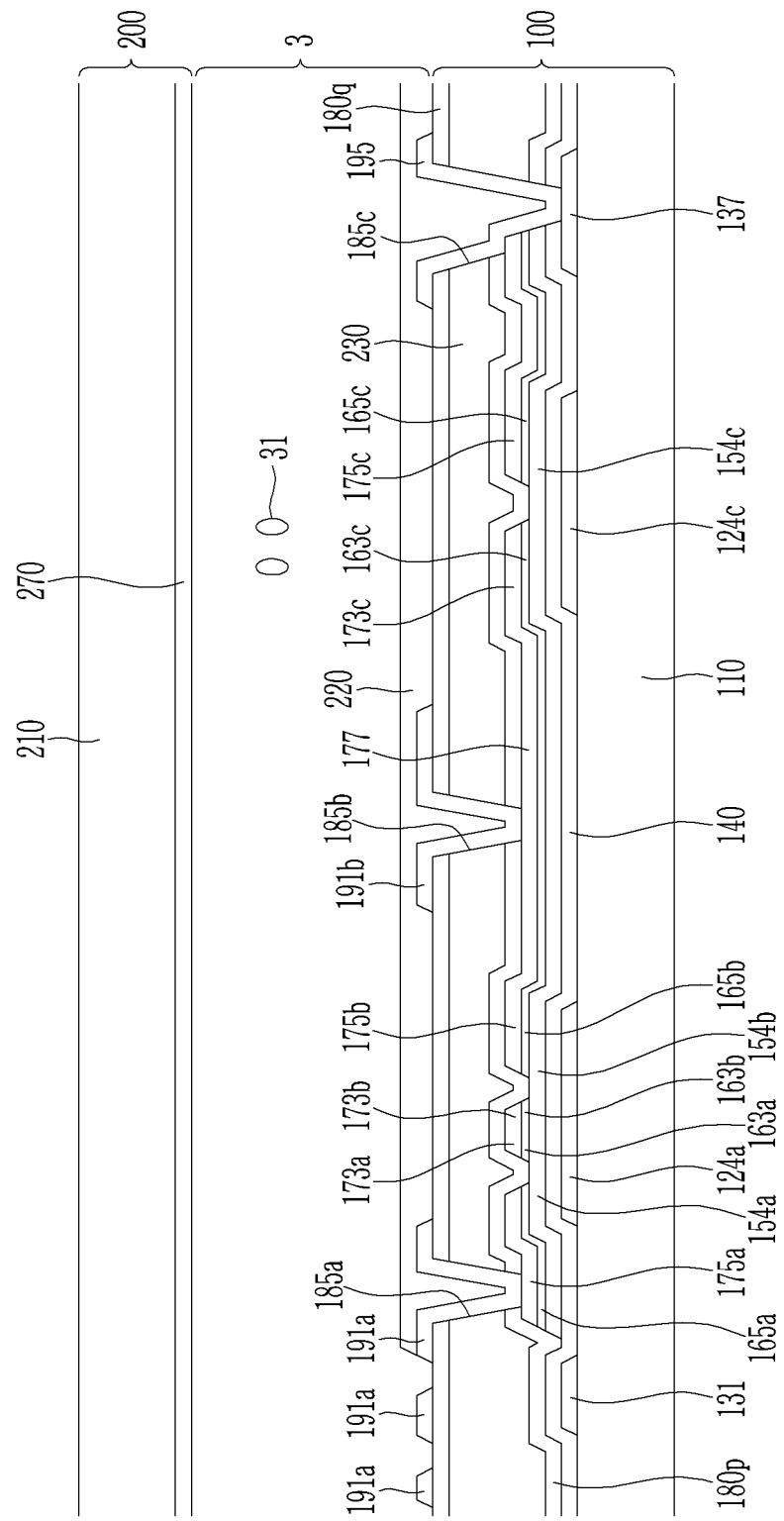
FIG. 7 is a cross-sectional view taken along line VII-VII of FIG. 6.
Figure 8:
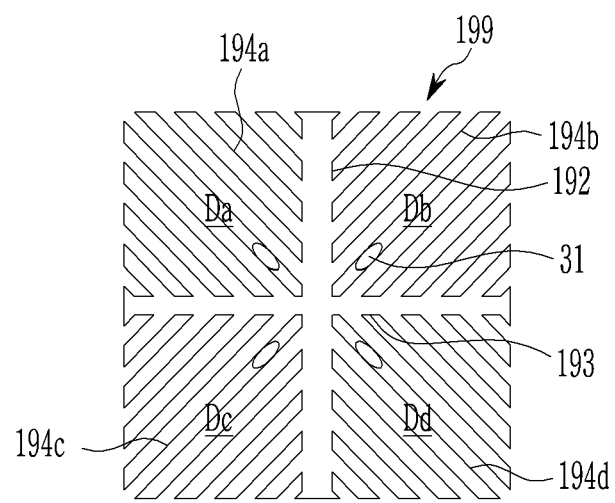
FIG. 8 is a top plan view illustrating a basic region of a pixel electrode of a display device according to an embodiment.

Hereinafter, one pixel of the display device according to the embodiment will be described with references to FIG. 5, FIG. 6, FIG. 7, and FIG. 8. FIG. 5 is an equivalent circuit diagram of one pixel of a display device according to an embodiment, FIG. 6 is a layout diagram of one pixel of a display device according to an embodiment, FIG. 7 is a cross-sectional view taken along line VII-VII of FIG. 6, and FIG. 8 is a top plan view illustrating a basic region of a pixel electrode of a display device according to an embodiment.

First, referring to FIG. 5, one pixel PX of the liquid crystal display may include a plurality of signal lines including a gate line GL for transmitting a gate signal, a data line DL for transmitting a data signal, a divided reference voltage line RL for transmitting a divided reference voltage, first, second, and third switching elements Qa, Qb, and Qc connected to the plurality of signal lines, and first and second liquid crystal capacitors Clca and Clcb.

The first and second switching elements Qa and Qb are respectively connected to the gate line GL and the data line DL, and the third switching element Qc is connected to an output terminal of the second switching element Qb and the divided reference voltage line RL.

The first switching element Qa and the second switching element Qb are three-terminal elements such as a thin film transistors so that control terminals are connected to the gate line GL, input terminals are connected to the data line DL, an output terminal of the first switching element Qa is connected to the first liquid crystal capacitor Clca, and an output terminal of the second switching element Qb is connected to the second liquid crystal capacitor Clcb and an input terminal of the third switching element Qc simultaneously.

The third switching element Qc is also a three-terminal element such as a thin film transistor so that a control terminal is connected to the gate line GL, an input terminal is connected to the second liquid crystal capacitor Clcb, and an output terminal is connected to the divided reference voltage line RL.

When a gate-on signal is applied to the gate line GL, the first switching element Qa, the second switching element Qb, and the third switching element Qc connected to the gate line GL are turned on. Thus, a data voltage applied to the data line DL is applied to a first subpixel electrode PEa and a second subpixel electrode PEb through the turned-on first switching element Qa and the turned-on second switching element Qb. In this case, the data voltages applied to the first subpixel electrode PEa and the second subpixel electrode PEb are equal, and the first and second liquid crystal capacitors Clca and Clcb are charged with the same value as a difference between the common voltage and the data voltage. Simultaneously, a voltage charged to the second liquid crystal capacitor Clcb is divided through the turned-on third switching element Qc. Thus, the voltage charged to the second liquid crystal capacitor Clcb decreases by a difference between the common voltage and the divided reference voltage. That is, a voltage charged to the first liquid crystal capacitor Clca is higher than that charged to the second liquid crystal capacitor Clcb.

As such, the voltages charged to the first and second liquid crystal capacitors Clca and Clcb are different from each other. Since the voltage of the first and second liquid crystal capacitors Clca and Clcb are different from each other, angles at which liquid crystal molecules are inclined in the first subpixel and the second subpixel are different, and thus luminance of the two subpixels are different. Accordingly when the voltages of the first and second liquid crystal capacitors Clca and Clcb are appropriately adjusted, an image viewed from a lateral side is as close as possible to an image viewed from a front side, thereby improving side visibility.

In the shown embodiment, the third switching element Qc connected to the second liquid crystal capacitor Clcb and the divided reference voltage line RL is included to make the voltages charged to the first and second liquid crystal capacitors Clca and Clcb different, but the second liquid crystal capacitor Clcb may be connected to a step-down capacitor (not shown) in another embodiment of the present disclosure. Specifically, the third switching element including a first terminal connected to a step-down gate line, a second terminal connected to the second liquid crystal capacitor Clcb, and a third terminal connected to the step-down capacitor may be included such that an amount of charges charged in the second liquid crystal capacitor Clcb may be partially charged in the step-down capacitor, thereby differently setting the charged voltages between the first and second liquid crystal capacitors Clca and Clcb. In addition, in a liquid crystal display according to another embodiment, the first liquid crystal capacitor Clca and the second liquid crystal capacitor Clcb are connected to different data lines to receive different data voltages, and thus it is possible to differently set the charged voltage between the first liquid crystal capacitor Clca and the second liquid crystal capacitor Clcb. Alternatively, by various different methods, the charged voltages between the first and second liquid crystal capacitors Clca and Clcb may be differently set.

A structure of the liquid crystal display according to the embodiment will be briefly described with reference to FIG. 6, FIG. 7, and FIG. 8.

Referring to FIG. 6 and FIG. 7, the liquid crystal display according to the embodiment includes a lower display panel 100 and an upper display panel 200 facing the lower display panel 100, a liquid crystal layer 3 interposed between the two display panels 100 and 200, and a pair of polarizers (not shown) attached to outer surfaces of the display panels 100 and 200.

First, the lower display panel 100 will be described.

A gate conductor (not shown) including a gate line 121 and a voltage line 131 are disposed on the first substrate 110 which is made of transparent glass or plastic.

The gate line 121 includes a first gate electrode 124a, a second gate electrode 124b, a third gate electrode 124c, and a wide end portion (not shown) for connection with another layer or an external driving circuit.

A voltage line 131 includes a first storage electrode 135, a second storage electrode 136, and a reference electrode 137. The second storage electrode 136 may be connected to an additional voltage line (not shown) disposed below the second storage electrode 136.

The gate insulating film 140 is disposed on the gate line 121 and the voltage line 131.

A first semiconductor 154a, a second semiconductor 154b, and a third semiconductor 154c are disposed on the gate insulating film 140.

A data conductor including plurality of data lines 171 including a first source electrode 173a and a second source electrode 173b, a first drain electrode 175a, a second drain electrode 175b, a third source electrode 173c, and a third drain electrode 175c is disposed on ohmic contact members 163a, 165a, 163b, 165b, 163c, and 165c and a gate insulating film 140.

The data conductor and the semiconductor and the ohmic contact member which are disposed the data conductor may be formed simultaneously using one mask.

Each of the data lines 171 includes a wide end portion (not shown) for connection with another layer or an external driving circuit.

The first gate electrode 124a, the first source electrode 173a, and the first drain electrode 175a together with the first semiconductor 154a form one first thin film transistor (TFT), and a channel of the first thin film transistor is formed in the semiconductor 154a which is disposed between the first source electrode 173a and the first drain electrode 175a. Similarly, the second gate electrode 124b, the second source electrode 173b, and the second drain electrode 175b together with the second semiconductor 154b form one second thin film transistor, and a channel of the second thin film transistor is formed in the semiconductor 154b which is disposed between the second source electrode 173b and the second drain 175b. The third gate electrode 124c, the third source electrode 173c, and the third drain electrode 175c together with the third semiconductor 154c form one third thin film transistor, and a channel of the third thin film transistor is formed in the semiconductor 154c which is disposed between the third source electrode 173c and the third drain electrode 175c.

The second drain electrode 175b is connected to the third source electrode 173c, and includes a widened extension 177.

The first passivation film 180p is disposed on the data conductors 171, 173c, 175a, 175b, and 175c and the exposed semiconductors 154a, 154b, and 154c. The first passivation film 180p may include an inorganic insulating film such as a silicon nitride or silicon oxide. The first passivation film 180p may prevent a pigment of the color filter 230 from flowing into exposed portions of the semiconductors 154a, 154b, and 154c.

The color filter 230 is disposed on the first passivation film 180p. The color filter 230 extends in a second direction to be parallel to the data line 171. Although not shown, two adjacent color filters 230 overlap each other to form an overlapping portion.

A second passivation film 180q is disposed on the color filter 230.

The second passivation film 180q may include an inorganic insulating film such as a silicon nitride or silicon oxide. The second passivation film 180q prevents the color filter 230 from being lifted and suppresses the liquid crystal layer 3 from being polluted due to an organic material such as a solvent inflowing from the color filter 230, thereby preventing defects, such as an afterimage which may occur at the time of driving a screen, from occurring.

A first contact hole 185a and a second contact hole 185q overlapping the first drain electrode 175a and the second drain electrode 175b are formed in the first passivation film 180p and the second passivation film 180q.

A third contact hole 185c overlapping a portion of the reference electrode 137 and a portion of the third drain electrode 175c is formed in the first passivation film 180p, the second passivation film 180q, and the gate insulating film 140, and a connecting member 195 covers the third contact hole 185c. The connecting member 195 electrically connects the reference electrode 137 and the third drain electrode 175c exposed through the third contact hole 185c.

A plurality of pixel electrodes 191 are disposed on the second passivation film 180q. Each of the pixel electrodes 191 includes a first subpixel electrode 191a and a second subpixel electrode 191b that are separated from each other with the gate line 121 disposed between the first subpixel electrode 191a and the second subpixel electrode 191b, and that are adjacent to each other in a second direction based on the gate line 121. The pixel electrode 191 may be made of a transparent material such as an ITO and an IZO. The pixel electrode 191 may be made of a transparent conductive material such as an ITO or IZO or of a reflective metal such as aluminum, silver, chromium, or an alloy of aluminum, silver, and chromium.

Each of the first subpixel electrode 191a and the second subpixel electrode 191b includes one or more of a basic electrode 199, and a variation shown in FIG. 8.

The first subpixel electrode 191a and the second subpixel electrode 191b are physically and electrically connected to the first drain electrode 175a and the second drain electrode 175b through the first contact hole 185a and the second contact hole 185b, respectively, and they separately receive a data voltage from the first drain electrode 175a and the second drain electrode 175b. In this case, a portion of the data voltage applied to the second drain electrode 175b is divided through the third source electrode 173c such that a voltage applied to the first subpixel electrode 191a is larger than a voltage applied to the second subpixel electrode 191b.

The first and second subpixel electrodes 191a and 191b to which the data voltage is applied determine a direction of liquid crystal molecules of the liquid crystal layer 3 between the two electrodes 191 and 270 by generating an electric field together with a common electrode 270 of the upper display panel 200. Luminance of light passing through the liquid crystal layer 3 varies according to the direction of the liquid crystal molecules determined as described above.

A light blocking member 220 is disposed on the pixel electrode 191. The light blocking member 220 covers all of regions in which the first transistor, the second transistor, the third transistor, and the first, second, and third contact holes 185a, 185b, and 185c are disposed, and they extend in the same direction as the gate line 121 and the voltage line 131 so as to overlap a portion of the data line 171. The light blocking member 220 may prevent light leakage that may occur near the data line 171 and the gate line 121, and prevent light leakage in a region in which the first transistor, the second transistor, and the third transistor are disposed.

Before the light blocking member 220 is formed, the first passivation film 180p, the color filter 230, and the second passivation film 180q are disposed in the region in which the first transistor, the second transistor Qb, the third transistor, and the first to third contact holes 185a, 185b, and 185c are disposed, so that positions of the first transistor, the second transistor Qb, the third transistor, and the first, second, and third contact holes 185a, 185b, and 185c may be easily distinguished. Therefore, if a defect occurs in the first transistor, the second transistor, and/or the third transistor during a manufacturing process, the defect of the first transistor, the second transistor, and the third transistor may be repaired before the light blocking member 220 is formed. As such, the color filter 230 is formed in the region in which the first transistor, the second transistor Qb, and the third transistor are disposed, and after the defect is repaired, they are covered with the light blocking member 220 to prevent light leakage, whereby the light leakage is prevented in a region adjacent to the data line and the gate line, and degradation of performance characteristics of the thin film transistor due to unnecessary thin film formation due to a step of the light blocking member that may occur when the light blocking member is formed around and on the thin film transistor is prevented, and the thin film transistor may be easily repaired by disposing the color filter on the thin film transistor. In addition, the color filter and the light blocking member may be formed on the thin film transistor display panel to prevent light leakage due to an alignment error.

Hereinafter, the upper display panel 200 will be described.

A common electrode 270 is disposed on the second substrate 210. An upper alignment film (not shown) is disposed on the common electrode 270. The upper alignment film may be a vertical alignment film.

The liquid crystal layer 3 has negative dielectric anisotropy, and the liquid crystal molecules of the liquid crystal layer 3 are aligned such that their long axes are substantially perpendicular to the surfaces of the two display panels 100 and 200 in the absence of an electric field. More specifically, the long axis of the liquid crystal molecule is arranged to be inclined by a pretilt angle with respect to the surfaces of the two display panels 100 and 200, and when the electric field is applied by the pretilt direction, a direction in which the liquid crystal molecule of the liquid crystal layer is inclined is determined. However, since the pretilt angle is not relatively large, the liquid crystal molecules of the liquid crystal layer are arranged to be substantially perpendicular to the surfaces of the display panels 100 and 200.

Hereinafter, a basic electrode 199 will be described with reference to FIG. 8.

As shown in FIG. 8, an overall shape of the basic electrode 199 is quadrangular, and includes a cross stem portion including a horizontal stem portion 193 and a vertical stem portion 192 which is perpendicular to the stem portion 193. In addition, the basic electrode 199 is divided into a first subregion Da, a second subregion Db, a third subregion Dc, and a fourth subregion Dd by the horizontal stem portion 193 and the vertical stem portion 192. The subregions Da, Db, Dc, and Dd include a plurality of first minute branch portions 194a, a plurality of second minute branch portions 194b, a plurality of third minute branch portions 194c, and a plurality of fourth minute branch portions 194d, respectively.

The first minute branch portions 194a obliquely extend in an upper left direction from the horizontal stem portion 193 or the vertical stem portion 192, and the second minute branch portions 194b obliquely extend in an upper right direction from the horizontal stem portion 193 or the vertical stem portion 192. In addition, the third minute branch portions 194c obliquely extend in a lower left direction from the horizontal stem portion 193 or the vertical stem portion 192, and the fourth minute branch portions 194d obliquely extend obliquely in a lower right direction from the horizontal stem portion 193 or the vertical stem portion 192.

The first minute branch portions 194a, the second minute branch portions 194b, the third minute branch portions 194c, and the fourth minute branch portions 194d form angles of about 45 degrees or 135 degrees with the gate line 121 or the horizontal stem portion 193. In addition, the minute branch portions 194a, 194b, 194c, and 194d of two adjacent subregions Da, Db, Dc, and Dd may be perpendicular to each other.

The minute branch portions 194a, 194b, 194c, and 194d may have a width of about 2.5 μm to about 5.0 μm, and an interval between adjacent minute branch portions 194a, 194b, 194c, and 194d in one subregion Da, Db, Dc, or Dd may be about 2.5 μm to about 5.0 μm.

According to another embodiment of the present disclosure, the width of the minute branch portion 194a, 194b, 194c, and 194d may be wider as they get closer to the horizontal stem portion 193 or the vertical stem portion 192, and a difference between a widest portion and a narrowest portion in one minute branch portion 194a, 194b, 194c, and 194d may be about 0.2 μm to about 1.5 μm.

The first subpixel electrode 191a and the second subpixel electrode 191b are connected to the first drain electrode 175a or the second drain electrode 175b through the first contact hole 185a and the second contact hole 185b respectively, and they respectively receive a data voltage from the first drain electrode 175a and the second drain electrode 175b. In this case, sides of the first, second, third, and fourth minute branch portions 194a, 194b, 194c, and 194d distort an electric field to generate horizontal components that determine the inclination direction of the liquid crystal molecules 31. A horizontal component of the electric field is substantially horizontal to the sides of the first, second, third, and fourth minute branch portions 194a, 194b, 194c, and 194d. Therefore, as shown in FIG. 8, the liquid crystal molecules 31 are inclined in a direction parallel to a length direction of the minute branch portions 194a, 194b, 194c, and 194d. Since one pixel electrode 191 includes four subregions Da to Dd having different length directions of the minute branch portions 194a, 194b, 194c, and 194d, the direction in which the liquid crystal molecules 31 are inclined is substantially four directions, and thus four domains with different alignment directions of the liquid crystal molecules 31 are formed in the liquid crystal layer 3. As described above, when the liquid crystal molecules are inclined in various directions, a reference viewing angle of the liquid crystal display increases.

The first, second, third, fourth, and fifth voltage lines 131a, 131b, 131c, 131d, and 131e described above with reference to FIG. 1, FIG. 2, FIG. 3 and FIG. 4 may correspond to the voltage line 131 described with reference to FIG. 5, FIG. 6, FIG. 7, and FIG. 8, the first, second, and third data lines 171a, 171b, and 171c described with reference to FIG. 1, FIG. 2, FIG. 3, and FIG. 4 may correspond to the data line 171 described with reference to FIG. 5, FIG. 6, FIG. 7, and FIG. 8, and the first, second, and third color filters 230A, 230B, and 230C described with reference to FIG. 1, FIG. 2, FIG. 3, and FIG. 4 may correspond to the color filter 230 described with reference to FIG. 5, FIG. 6, FIG. 7, and FIG. 8.

Figure 9:
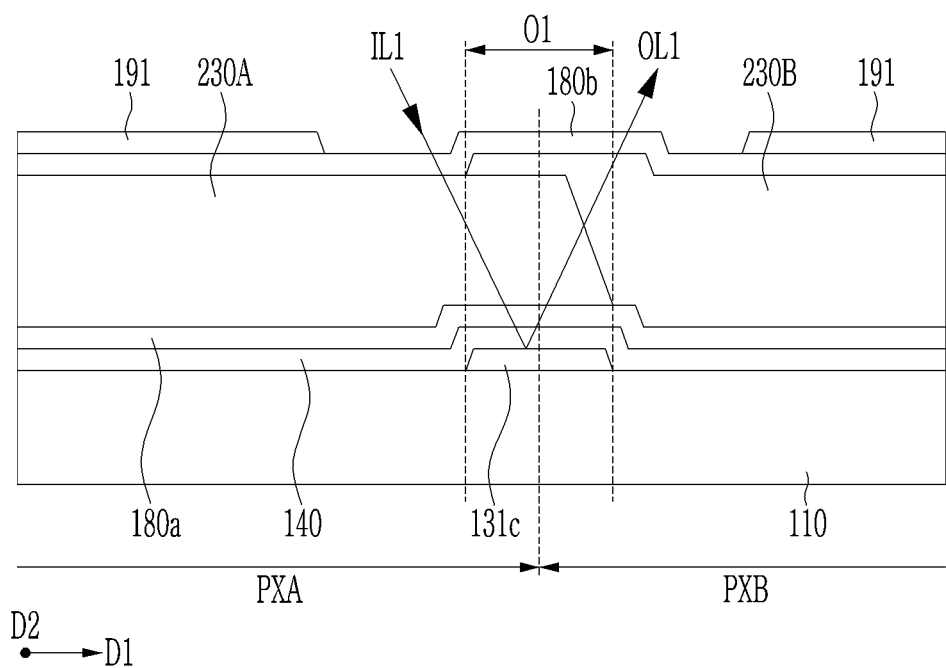
FIG. 9, FIG. 10, and FIG. 11 are diagrams for explaining a path of light incident and reflected on a signal line of a display device according to an embodiment.
Figure 10:
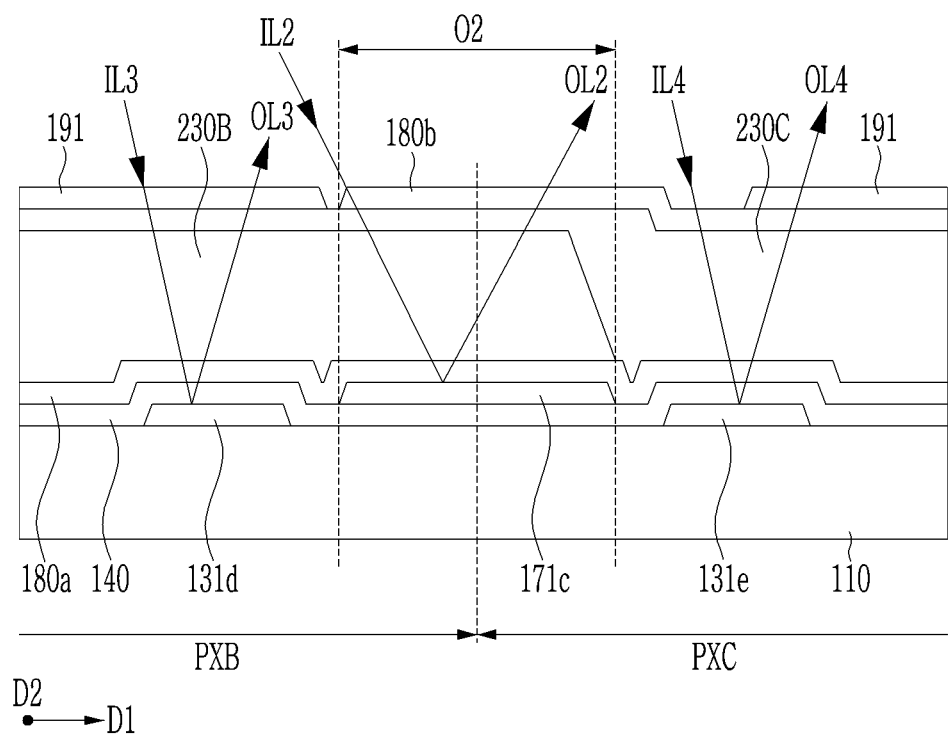
Figure 11:
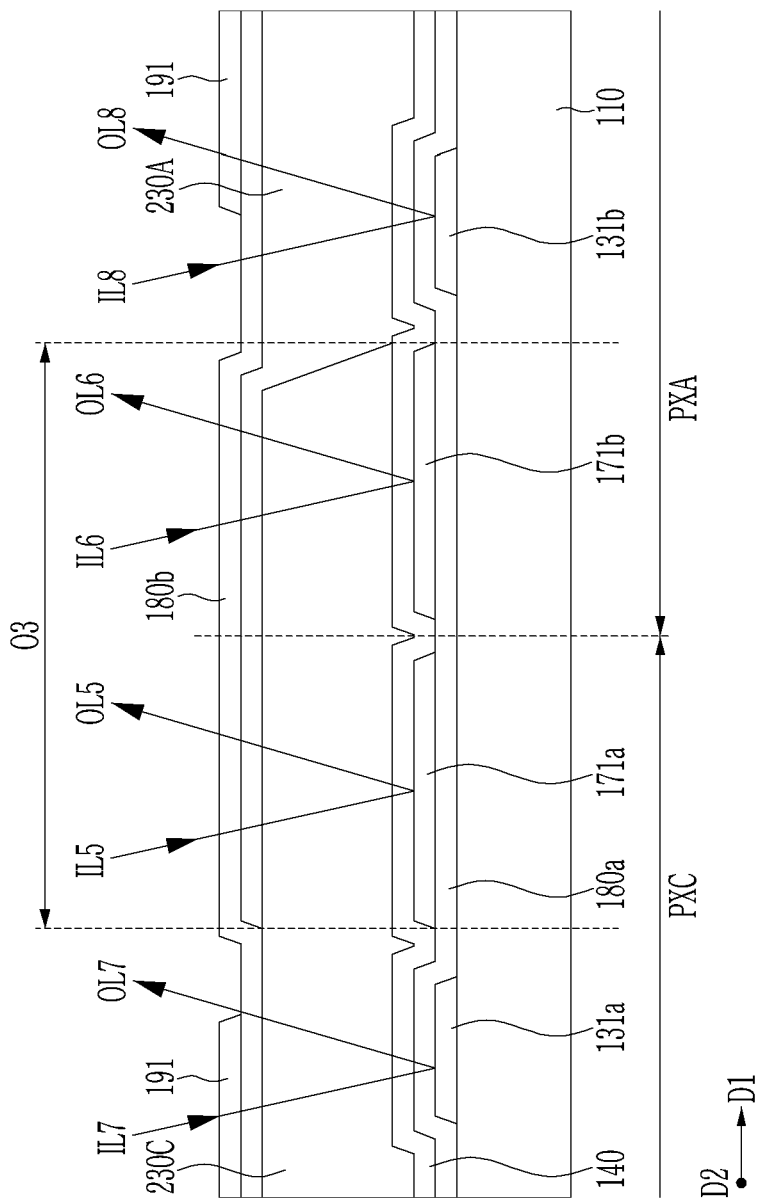
Figure 12:
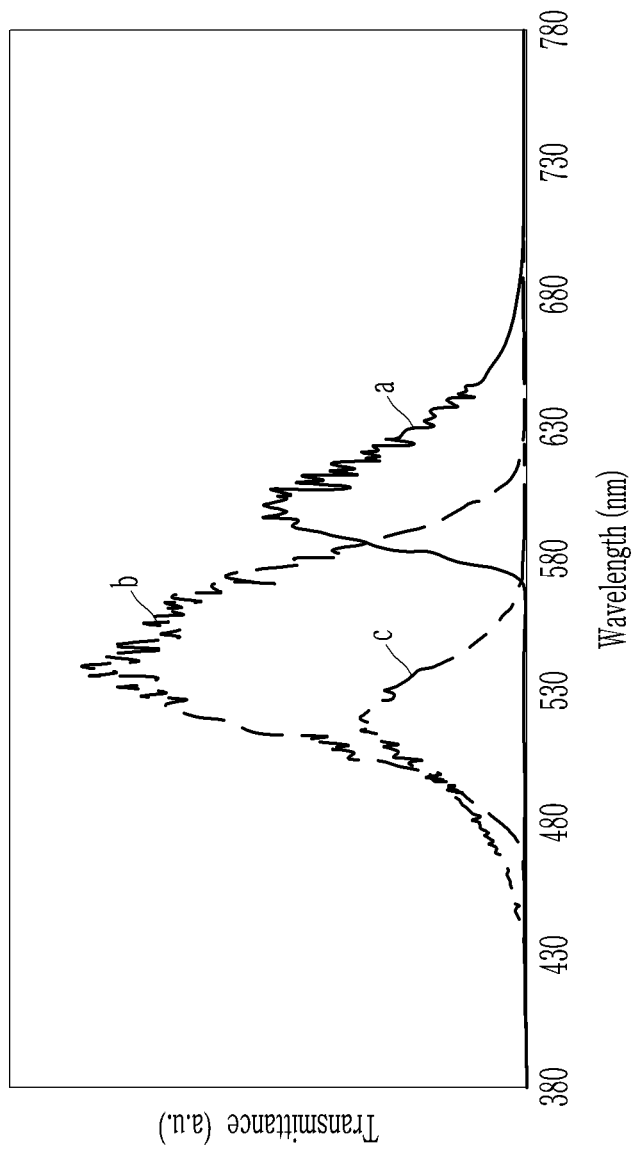
FIG. 12 is a diagram illustrating transmittance of a color filter.
Figure 13:
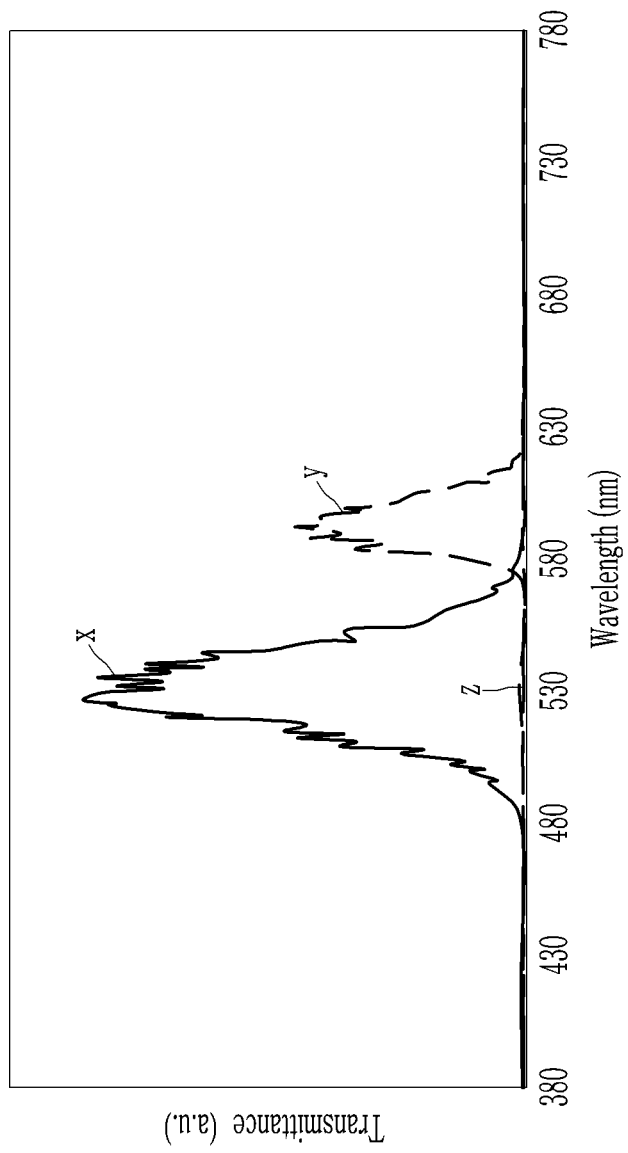
FIG. 13 is a diagram illustrating transmittance of an overlapping portion of a color filter.

Hereinafter, reflection of light incident on the display device will be described with reference to FIG. 12 and FIG. 13 along with FIG. 9, FIG. 10, and FIG. 11. FIG. 9, FIG. 10, and FIG. 11 are diagrams for explaining a path of light incident and reflected on a signal line of a display device according to an embodiment, FIG. 12 is a diagram illustrating transmittance of a color filter, and FIG. 13 is a diagram illustrating transmittance of an overlapping portion of a color filter.

Referring to FIG. 9, FIG. 10, and FIG. 11 together with FIG. 1, the third voltage line 131c is disposed between the first pixel PXA and the second pixel PXB that are adjacent to each other, the fourth voltage line 131d and the fifth voltage line 131e are disposed on the second pixel PXB and the third pixel PXC that are adjacent to each other, respectively, the third data line 171c is disposed between the fourth voltage line 131d and the fifth voltage line 131e, the first voltage line 131a and the second voltage line 131b are disposed on the first pixel PXA and the third pixel PXC that are adjacent to each other, respectively, and the first data line 171a and the second data line 171b are disposed between the first voltage lines 131a and the second voltage line 131b that are adjacent to each other.

Referring to FIG. 9 together with FIG. 1, first incident light IL1 incident from the outside is reflected on a surface of the third voltage line 131c disposed between the first pixel PXA and the second pixel PXB that are adjacent to each other to pass through the first color filter 230A and the second color filter 230B of the first overlapping portion O1, and then it is outputted as first output light OL1.

Referring to FIG. 10 together with FIG. 1, second incident light IL2 incident from the outside is reflected on the surface of the third data line 171c disposed between the second pixel PXB and the third pixel PXC that are adjacent to each other and then passes through the second color filter 230B and the third color filter 230C in the second overlapping portion O2 to be outputted as second output light OL2; third incident light IL3 incident from the outside is reflected on the surface of the fourth voltage line 131d and then passes through the second color filter 230B to be output as third output light OL3; and fourth incident light IL4 incident from the outside is reflected on the surface of the fifth voltage line 131e and then passes through the third color filter 230C to be output as fourth output light OL4.

Referring to FIG. 11 along with FIG. 1, fifth incident light IL5 incident from the outside is reflected on the surface of the first data line 171a disposed between the third pixel PXC and the first pixel PXA that are adjacent to each other and then passes through the third color filter 230C and the first color filter 230A in the third overlapping portion O3 to be outputted as fifth output light OL5; sixth incident light IL6 is reflected on the surface of the second data line 171b disposed between the third pixel PXC and the first pixel PXA that are adjacent to each other and then passes through the third color filter 230C and the first color filter 230A in the third overlapping portion O3 to be output as sixth output light OL6; seventh incident light IL7 incident from the outside is reflected on the surface of the first voltage line 131a and then passes through the third color filter 230C to be output as seventh output light OL7; and eighth incident light IL8 incident from the outside is reflected on the surface of the second voltage line 131b and then passes through the first color filter 230A to be outputted as eighth output light OL8.

FIG. 12 illustrates transmittances a, b, and c according to wavelengths of the first color filter 230A, the second color filter 230B, and the third color filter 230C. Referring to FIG. 12, the transmittance b of the second color filter 230B disposed in the second pixel PXB is relatively largest, and the transmittance c of the third color filter 230C disposed in the third pixel PXC is relatively smallest. The transmittance a of the first color filter 230A disposed in the first pixel PXA is smaller than the transmittance b of the second color filter 230B and larger than the transmittance c of the third color filter 230C.

FIG. 13 illustrates transmittances x, y, and z according to overlap of two color filters among the first color filter 230A, the second color filter 230B, and the third color filter 230C. Referring to FIG. 13, the light transmittance x according to the overlap of the first color filter 230A and the second color filter 230B is relatively largest; the light transmittance z according to overlap of the third color filter 230C and the first color filter 230A is relatively smallest; and the light transmittance y according to overlap of the second color filter 230B and the third color filter 230C is smaller than the light transmittance x according to the overlap of the first color filter 230A and the second color filter 230B and greater than the light transmittance z according to the overlap of the third color filter 230C and the first color filter 230A.

Referring to FIG. 12 and FIG. 13 together with FIG. 11, the third overlapping portion O3 of the third color filter 230C and the first color filter 230A having the relatively smallest light transmittance when the color filters overlap each other overlaps two data lines, that is, the first data line 171a and the second data line 171b. Therefore, the fifth output light OL5 and the sixth output light OL6 that are incident from the outside and reflected on the surfaces of the first data line 171a and the second data line 171b and then pass through the third overlapping portion O3 of the third color filter 230C and the first color filter 230A, have relatively low transmittance. In addition, the transmittances of the seventh output light OL7 and the eighth output light OL8 that are reflected on the surfaces of the first voltage line 131a and the second voltage line 131b and then pass through the third color filter 230C and the first color filter 230A are lower than that of output light that passes through the second color filter 230B to be outputted. Since the gate insulating film 140 is disposed between the first voltage line 131a to the fifth voltage line 131e and the first data line 171a to the third data line 171c, among the light incident from the outside, a path of the light reflected from the surfaces of the first, second, third, fourth, and fifth voltage lines 131a, 131b, 131c, 131d, and 131e is longer than a path of the light reflected from the surfaces of the first, second, and third data lines 171a, 171b, and 171c, and transmittance of output light with a relatively longer light path is lower than that of output light with a relatively shorter light path. Therefore, the third overlapping portion O3 of the third color filter 230C and the first color filter 230A overlaps the first data line 171a and the second data line 171b, thus the light reflected on the first data line 171a and the second data line 171b having a relatively short light path overlaps the third overlapping portion O3 of the third color filter 230C and the first color filter 230A, so that total transmittance of the light reflected on the surfaces of the signal lines 131a, 131b, 131c, 131d, 131e, 171a, 171b, and 171c may be reduced.

Referring to FIG. 12 and FIG. 13 along with FIG. 9, when the color filters are overlapped, since the first overlapping portion O1 of the first color filter 230A and the second color filter 230B having the relatively largest light transmittance overlaps the voltage line 131c disposed between the first pixel PXA and the second pixel PXB, only the first output light OL1 reflected and outputted from the surface of the third voltage line 131c among the reflected light passes through the first overlapping portion O1 of the first color filter 230A and the second color filter 230B. In addition, when the color filters are overlapped, since the first overlapping portion O1 of the first color filter 230A and the second color filter 230B having the relatively largest light transmittance overlaps the third voltage line 131c and does not overlap the first, second, and third data lines 171a, 171b, and 171c, the reflected light having a relatively long light path is outputted. In addition, when the color filters are overlapped, since the first overlapping portion O1 of the first color filter 230A and the second color filter 230B having the relatively largest light transmittance overlaps the third voltage line 131c which is one signal line, the reflected light passing through the first overlapping portion O1 is only the first output light OL1, and thus the total transmittance of the light reflected from the surface of the signal lines 131a, 131b, 131c, 131d, 131e, 171a, 171b, and 171c may be reduced.

Referring to FIG. 12 and FIG. 13 together with FIG. 10, when the color filters are overlapped, the second overlapping portion O2 of the second color filter 230B and the third color filter 230C having the light transmittance between the first overlapping portion O1 and the third overlapping portion O3 overlaps the third data line 171c disposed between the second pixel PXB and the third pixel PXC. Therefore, only the second output light OL2 reflected and outputted from the surface of the third data line 171c among the reflected light passes through the second overlapping portion O2 of the second color filter 230B and the third color filter 230C. Compared to FIG. 11, the third overlapping portion O3 overlaps two data lines, the first data line 171a and the second data line 171b, but the second overlapping portion O2 having higher light transmittance than that of the third overlapping portion O3 overlaps one data line, the third data line 171c, thus the total transmittance of light reflected on the surfaces of the signal lines 131a, 131b, 131c, 131d, 131e, 171a, 171b, and 171c may be reduced.

As described above, according to the display device according to the embodiment, when the color filters are overlapped, the third overlapping portion O3 of the third color filter 230C and the first color filter 230A having the relatively smallest light transmittance overlaps two data lines, the first data line 171a and the second data line 171b; when the color filters are overlapped, the first overlapping portion O1 of the first color filter 230A and the second color filter 230B having the relatively largest light transmittance overlaps one voltage line, the third voltage line 131c; and when the color filters are overlapped, the second overlapping portion O2 of the second color filter 230B and the third color filter 230C having the middle light transmittance overlaps one data line, the third data line 171c. Accordingly, the fifth output light OL5 and the sixth output light OL6 having the relatively short path of the reflected light pass through the third overlapping portion O3 having the relatively smallest transmittance; the second output light OL2 having the relatively short path of the reflected light passes through the second overlapping portion O2 having the middle transmittance; and the first output light OL1 having the relatively long path of the reflected light passes through the first overlapping portion O1 having the largest light transmittance, thus the total transmittance of light reflected on the surfaces of the signal lines 131a, 131b, 131c, 131d, 131e, 171a, 171b, and 171c may be reduced. In addition, since the first overlapping portion O1 having the largest light transmittance does not overlap the data line, the light having the relatively short path of the reflected light does not pass through the first overlapping portion O1. For example, compared to a case in which the first overlapping portion O1, the second overlapping portion O2, and the third overlapping portion O3 overlap the same number of data lines respectively, in the display device according to the embodiment, the third overlapping portion O3 having the lowest light transmittance overlaps two data lines, and the first overlapping portion O1 having the largest transmittance does not overlap the data line, thus the total transmittance of light reflected on the surfaces of the signal lines 131a, 131b, 131c, 131d, 131e, 171a, 171b, and 171c may be reduced.

In addition, since one data line and two voltage lines are disposed in each pixel, when it is compared to a case in which three data lines and six voltage lines are disposed in three pixel areas, an aperture ratio decreases because five voltage lines and three data lines are disposed in the three pixel areas.

As described above, according to the embodiment, the overlapping portion of the color filters having the lowest light transmittance overlaps the two data lines while reducing the aperture ratio by reducing the number of signal lines overlapping the color filters, so that it is possible to reduce the total transmittance of the output light of which the light incident from the outside is reflected and outputted from the surface of the signal lines.

Figure 14:
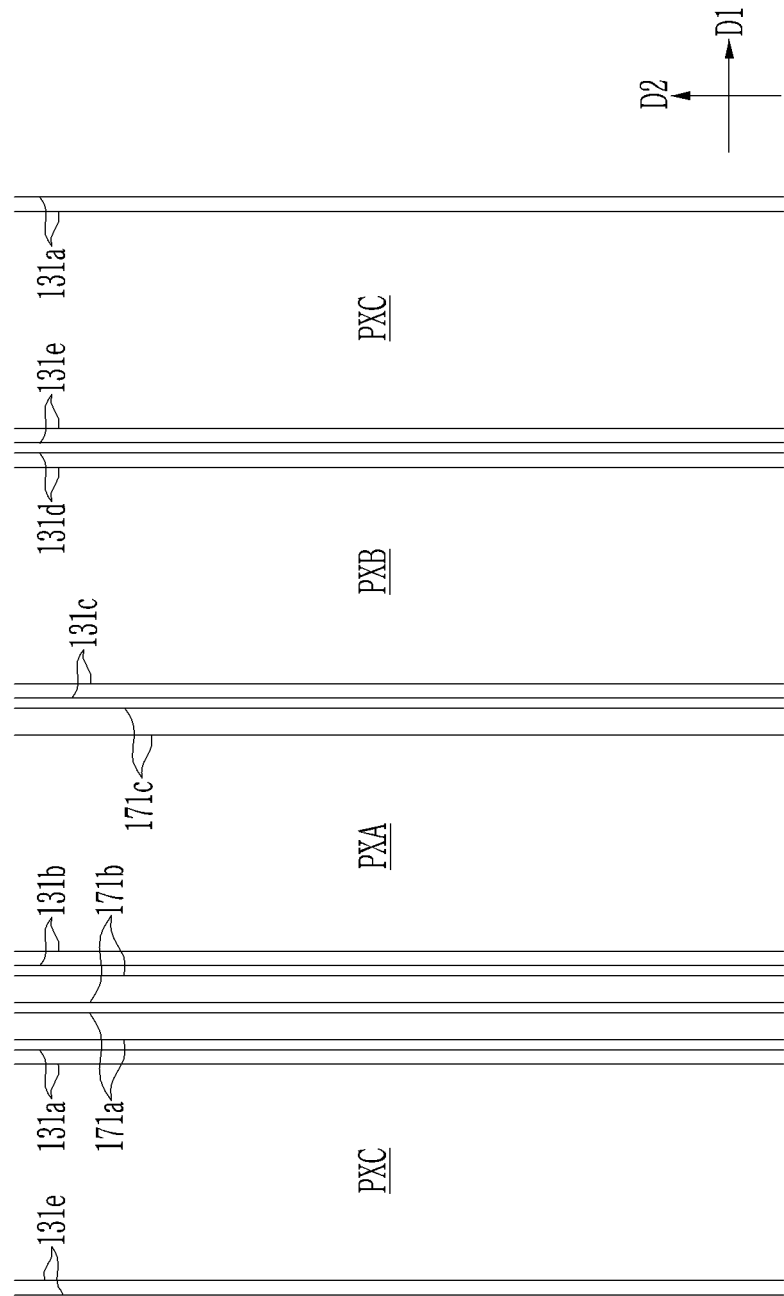
FIG. 14 is a layout view for illustrating an arrangement of signal lines of a display device according to another embodiment.

Hereinafter, an arrangement of signal lines of a display device according to another embodiment will be described with reference to FIG. 14. FIG. 14 is a layout view for illustrating an arrangement of signal lines of a display device according to another embodiment.

Referring to FIG. 14, the arrangement of the signal lines 131a, 131b, 131c, 131d, 131e, 171a, 171b, and 171c of the display device according to the embodiment is similar to that of the signal lines 131a, 131b, 131c, 131d, 131e, 171a, 171b, and 171c of the display device according to the embodiment shown in FIG. 1. However, unlike the display device according to the embodiment shown in FIG. 1, in the embodiment shown in FIG. 14, the third data line 171c may be disposed between the first pixel PXA and the second pixel PXB. According to the embodiment of FIG. 14, the overlapping portion of the first color filter 230A and the third color filter 230C having the relatively smallest transmittance of the overlapping portion of the color filter overlaps the two data lines, the first data line 171a and the second data line 171b, thus the total transmittance of the light reflected on the surfaces of the signal lines 131a, 131b, 131c, 131d, 131e, 171a, 171b, and 171c may be reduced. All of the features of the display device described above with reference to FIG. 1, FIG. 2, FIG. 3, FIG. 4, FIG. 5, FIG. 6, FIG. 7 and FIG. 8 may be applied to the display device according to the embodiment shown in FIG. 14.

Figure 15:
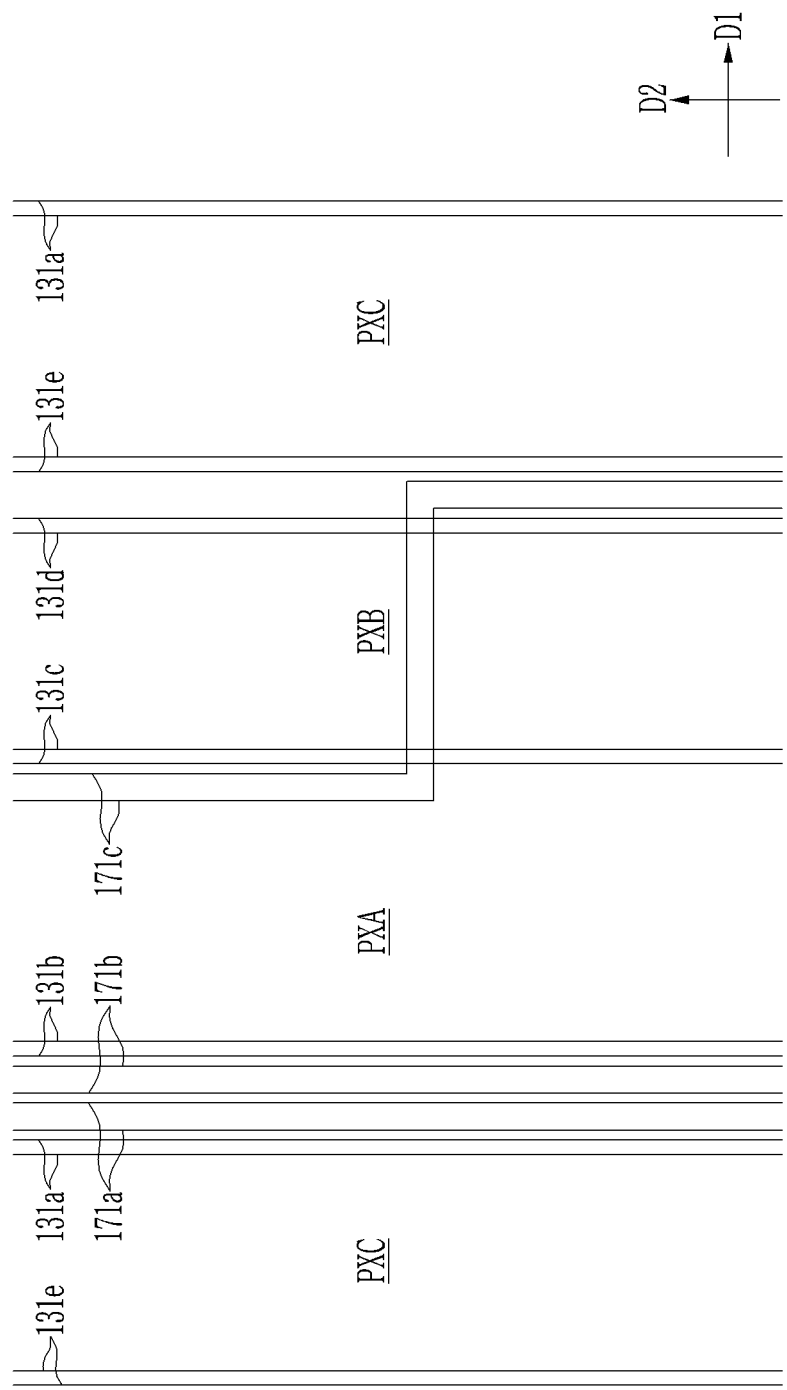
FIG. 15 is a layout view for illustrating an arrangement of signal lines of a display device according to another embodiment.

Hereinafter, an arrangement of signal lines of a display device according to another embodiment will be described with reference to FIG. 15. FIG. 15 is a layout view for illustrating an arrangement of signal lines of a display device according to another embodiment.

Referring to FIG. 15, the arrangement of the signal lines 131a, 131b, 131c, 131d, 131e, 171a, 171b, and 171c of the display device according to the embodiment is similar to that of the signal lines 131a, 131b, 131c, 131d, 131e, 171a, 171b, and 171c of the display device according to the embodiment shown in FIG. 1. However, unlike the display device according to the embodiment shown in FIG. 1, in the embodiment shown in FIG. 15, a portion of the third data line 171c may be disposed between the first pixel PXA and the second pixel PXB, and the other portion of the third data line 171c is disposed between the second pixel PXB and the third pixel PXC. As such, by disposing the third data line 171c for applying the data voltage to the second pixel PXB at respective sides of the second pixel PXB, a change in capacitance of a parasitic capacitor, which may occur due to a difference between an overlapping area of the first pixel PXA and the third data line 171c and an overlapping area of the third pixel PXC and the third data line 171c, may be reduced, so that it is possible to prevent display quality deterioration that may occur due to the change in capacitance of the parasitic capacitor. According to the embodiment of FIG. 15, the overlapping portion of the first color filter 230A and the third color filter 230C having the relatively smallest transmittance of the overlapping portion of the color filter overlaps the two data lines, the first data line 171a and the second data line 171b, thus the total transmittance of the light reflected on the surfaces of the signal lines 131a, 131b, 131c, 131d, 131e, 171a, 171b, and 171c may be reduced. All of the features of the display device described above with reference to FIG. 1, FIG. 2, FIG. 3, FIG. 4, FIG. 5, FIG. 6, FIG. 7 and FIG. 8 may be applied to the display device according to the embodiment shown in FIG. 15.

As described above, according to the embodiments, the overlapping portion of the color filters having the lowest light transmittance overlaps the two data lines while reducing the aperture ratio by reducing the number of signal lines overlapping the color filters, so that it is possible to reduce the total transmittance of the output light of which the incident light incident from the outside is reflected and outputted from the surface of the signal lines.

While this present disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

PXA, PXB, PXC: pixel
O1, O2, O3: overlapping portions of color filters
IL1, IL2, IL3, IL4, IL5, IL6, IL7, IL8: incident lights
OL1, OL2, OL3, OL4, OL5, OL6, OL7, OL8: output lights
131, 131a, 131b, 131c, 131d, 131e: voltage lines
171, 171a, 171b, 171c: data lines
230A, 230B, 230C: color filters

What is claimed is:
1. A display device comprising:
a plurality of pixels disposed along a first direction and comprising a first pixel including a first color filter, a second pixel including a second color filter, and a third pixel including a third color filter;
a plurality of first signal lines and a plurality of data lines extending in a second direction substantially perpendicular to the first direction;
a first overlapping portion in which the first color filter and the second color filter overlap each other in an adjacent portion of the first pixel and the second pixel without overlapping the data lines;
a second overlapping portion in which the second color filter and the third color filter overlap each other that overlap one data line of the data lines in an adjacent portion of the second pixel and the third pixel; and
a third overlapping portion in which the third color filter and the first color filter overlap each other that overlap two data line of the data lines in an adjacent portion of the third pixel and the first pixel.
2. The display device of claim 1, wherein
the first overlapping portion, the second overlapping portion, and the third overlapping portion extend in the second direction.
3. The display device of claim 2, wherein
a width of the third overlapping portion is wider than a width of the second overlapping portion, and the width of the second overlapping portion is wider than a width of the first overlapping portion.
4. The display device of claim 3, wherein
light transmittance of the first overlapping portion is greater than light transmittance of the second overlapping portion, and the light transmittance of the second overlapping portion is greater than light transmittance of the third overlapping portion.
5. The display device of claim 4, wherein
light transmittance of the first color filter is smaller than light transmittance of the second color filter, and light transmittance of the third color filter is smaller than light transmittance of the first color filter.
6. The display device of claim 5, wherein
one of the plurality of first signal lines overlaps the first overlapping portion.
7. The display device of claim 6, wherein
two of the plurality of first signal lines are disposed at each side of the two data lines overlapping the third overlapping portion respectively.
8. The display device of claim 1, wherein
two of the plurality of first signal lines are disposed at each side of the one data line overlapping the second overlapping portion respectively.
9. The display device of claim 1, wherein
light transmittance of the first overlapping portion is greater than light transmittance of the second overlapping portion, and the light transmittance of the second overlapping portion is greater than light transmittance of the third overlapping portion.
10. The display device of claim 9, wherein
light transmittance of the first color filter is smaller than light transmittance of the second color filter, and light transmittance of the third color filter is smaller than light transmittance of the first color filter.
11. A display device comprising:
a plurality of pixels disposed along a first direction and including a first pixel, a second pixel, and a third pixel;
a first voltage line, a second voltage line, a third voltage line, a fourth voltage line, and a fifth voltage line disposed in order along the first direction and extending along a second direction substantially perpendicular to the first direction; and
a first data line, a second data line, and a third data line insulated from the first voltage line, the second voltage line, the third voltage line, the fourth voltage line, and the fifth voltage line disposed in order along the first direction, and extending along the second direction, wherein the first data line and the second data line are disposed between the first voltage line and the second voltage line adjacent to each other, the third data line is disposed between the fourth voltage line and the fifth voltage line adjacent to each other, and no data line is disposed between the first pixel and the second pixel.

12. The display device of claim 11, wherein the second voltage line, the third voltage line, and the second data line are connected to the first pixel, the third voltage line, the fourth voltage line, and the third data line are connected to the second pixel, and the fifth voltage line, the first voltage line, and the first data line are connected to the third pixel.

13. The display device of claim 12, wherein the first pixel includes a first color filter, the second pixel includes a second color filter, and the third pixel includes a third color filter, a first insulating film is disposed between the first voltage line, the second voltage line, the third voltage line, the fourth voltage line, the fifth voltage line and the first data line, the second data line, and the third data line, a second insulating film disposed on the first data line, the second data line, and the third data line are further included, and the first color filter, the second color filter, and the third color filter are disposed on the second insulating film.

14. A display device comprising:

a plurality of pixels disposed along a first direction and including a first pixel, a second pixel, and a third pixel;

a first voltage line, a second voltage line, a third voltage line, a fourth voltage line, and a fifth voltage line disposed in order along the first direction and extending along a second direction substantially perpendicular to the first direction;

a first data line, a second data line, and a third data line insulated from the first voltage line, the second voltage line, the third voltage line, the fourth voltage line, and the fifth voltage line disposed in order along the first direction, and extending along the second direction, wherein the first data line and the second data line are disposed between the first voltage line and the second voltage line adjacent to each other, the third data line is disposed between the second voltage line and the third voltage line adjacent to each other, and no data line is disposed between the second pixel and the third pixel.

15. The display device of claim 14, wherein the fourth voltage line and the fifth voltage line are disposed between the second pixel and the third pixel, and no data line is disposed between the fourth voltage line and the fifth voltage line.

16. The display device of claim 14, wherein the second voltage line, the third voltage line, and the second data line are connected to the first pixel, the third voltage line, the fourth voltage line, and the third data line are connected to the second pixel, and the fifth voltage line, the first voltage line, and the first data line are connected to the third pixel.

17. The display device of claim 16, wherein the first pixel includes a first color filter, the second pixel includes a second color filter, and the third pixel includes a third color filter, a first insulating film is disposed between the first voltage line, the second voltage line, the third voltage line, the fourth voltage line, the fifth voltage line and the first data line, the second data line, and the third data line, a second insulating film disposed on the first data line, the second data line, and the third data line are further included, and the first color filter, the second color filter, and the third color filter are disposed on the second insulating film.

18. A display device comprising:

a plurality of pixels disposed along a first direction and including a first pixel, a second pixel, and a third pixel;

a first voltage line, a second voltage line, a third voltage line, a fourth voltage line, and a fifth voltage line disposed in order along the first direction and extending along a second direction substantially perpendicular to the first direction;

a first data line, a second data line, and a third data line insulated from the first voltage line, the second voltage line, the third voltage line, the fourth voltage line, and the fifth voltage line disposed in order along the first direction, and extending along the second direction, wherein the first data line and the second data line are disposed between the first voltage line and the second voltage line, a portion of the third data line is disposed between the second voltage line and the third voltage line, and another portion of the third data line is disposed between the fourth voltage line and the fifth voltage line, and the portion of the third data line and the another portion of the third data line is connected to each other.

19. The display device of claim 18, wherein the second voltage line, the third voltage line, and the second data line are connected to the first pixel, the third voltage line, the fourth voltage line, and the third data line are connected to the second pixel, and the fifth voltage line, the first voltage line, and the first data line are connected to the third pixel.

20. The display device of claim 19, wherein the first pixel includes a first color filter, the second pixel includes a second color filter, and the third pixel includes a third color filter, a first insulating film disposed between the first voltage line, the second voltage line, the third voltage line, the fourth voltage line, the fifth voltage line and the first data line, the second data line, and the third data line, a second insulating film disposed on the first data line, the second data line, and the third data line are further included, and the first color filter, the second color filter, and the third color filter are disposed on the second insulating film.

* * * * *